(12) United States Patent
Shimaguchi

(10) Patent No.: US 6,865,966 B2
(45) Date of Patent: Mar. 15, 2005

(54) AUTOMATIC TRANSMISSION FOR A VEHICLE

(75) Inventor: Hiromichi Shimaguchi, Shizuoka-ken (JP)

(73) Assignee: Suzuki Motor Corporation, Shizuoka-ken (JP)

(*) Notice: Subject to any disclaimer, the term of this patent is extended or adjusted under 35 U.S.C. 154(b) by 0 days.

(21) Appl. No.: 10/397,997

(22) Filed: Mar. 26, 2003

(65) Prior Publication Data

US 2003/0183031 A1 Oct. 2, 2003

(30) Foreign Application Priority Data

Mar. 27, 2002 (JP) ........................................ 2002-088405

(51) Int. Cl.⁷ .............................................. F16H 59/00
(52) U.S. Cl. ..................................................... 74/336 R
(58) Field of Search ........................ 74/336 R; 180/197

(56) References Cited

U.S. PATENT DOCUMENTS

| | | | |
|---|---|---|---|
| 5,303,794 A | * 4/1994 | Hrovat et al. | ............... 180/197 |
| 6,044,719 A | 4/2000 | Reed, Jr. et al. | |
| 6,494,110 B2 | 12/2002 | Hatakeyama | |

| | | |
|---|---|---|
| 2001/0013258 A1 | 8/2001 | Kobayashi |

FOREIGN PATENT DOCUMENTS

| | | |
|---|---|---|
| JP | 05-248527 | 9/1993 |
| JP | 05-96617 U | 12/1993 |
| JP | 06-201027 | 7/1994 |
| JP | 2703169 B2 | 10/1997 |
| JP | 3011567 B2 | 12/1999 |
| JP | 2000-097297 | 4/2000 |
| JP | 2001-227599 | 8/2001 |
| JP | 2001-227600 | 8/2001 |
| JP | 2001-280495 | 10/2001 |
| JP | 2001-289288 | 10/2001 |

* cited by examiner

*Primary Examiner*—Dirk Wright
(74) *Attorney, Agent, or Firm*—Flynn, Thiel, Boutell & Tanis, P.C.

(57) ABSTRACT

In an automatic transmission, the vehicle motion can be started forward or backward, in which vehicle running suitable for a slippery road can be achieved automatically. For this purpose, a drive wheel spin detector is provided to detect whether the drive wheel is spinning. A sub-clutch is provided to engage one of the gear trains, other than the first-speed and reverse gear trains. A controller is provided to connect the sub-clutch clutch when a shift position is in a first-speed or a reverse position and when the drive wheel spin detector detects that the drive wheel is spinning.

8 Claims, 6 Drawing Sheets

TORQUE FLOW FOR START IN 1st SPEED

AUTOMATIC TRANSMISSION FOR A VEHICLE

FIELD OF THE INVENTION

This invention relates to an automatic transmission for a vehicle, and more particularly to an automatic transmission for a vehicle to permit the vehicle to start easier on slippery roads, such as snowy roads.

BACKGROUND OF THE INVENTION

A vehicle is equipped with a transmission system including an automatic transmission to convert driving force from an engine according to a driving state, and a transfer mechanism to distribute the driving force.

There are some automatic transmissions in which a normal gear-type manual transmission is automated so as to increase transfer efficiency of driving force as compared to the normal gear-type manual transmission. Some automatic transmissions, in which the normal gear-type manual transmission is automated, include an input shaft in connection with an engine through a main clutch, an output shaft in connection with drive wheels, a plurality of gear trains to transmit the driving force from the input shaft to the output shaft at different ratios, and a gear-shifting mechanism to change the engagement of the gear trains, with the shifting mechanism being operated when gears shift.

Such automatic transmissions based on the manual transmission are disclosed in JP Laid-Open No. 2001-227600 Official Gazette and JP Laid-Open No. 2000-97297 Official Gazette. In the automatic transmission based on the manual transmission according to JP Laid-Open No. 2001-227600, a third-speed drive gear is employed as an input-side gear train of a sub-clutch, and a fifth-speed drive gear is also employed as an output-side gear train so as to commonly and effectively utilize parts and manufacture equipment. An automatic transmission based on the manual transmission according to JP Laid-Open No. 2000-97297 comprises a dual input shaft having a first input shaft and a second input shaft concentric with the first shaft, and a dual clutch having two clutches for transmitting engine torque to the input shaft. Layout of dual input shaft and dual clutch is well arranged.

In the conventional automatic transmission in which the gear-type manual transmission is automated, a so-called "snow mode" is provided to control the drive wheel's spin to allow the vehicle to start easily on a slippery road, such as a snowy or icy road.

According to the automatic transmission with the snow mode, the snow mode controls the driving force at motion start-up of the vehicle, in most cases, not in the first (i.e. low) speed position but in the second-speed position so as to prevent the drive wheels from spinning on the slippery road. The normal snow mode is changed by a mode change switch in an auto-shift mode. However, the driver may forget to return the mode change switch, which remains in the snow mode, so that the vehicle always starts in the second-speed position. This results in a large load on devices during motion start-up, such as a torque converter and a start clutch, and can be a cause of fault or failure.

In addition, in the manual shifting for the automatic transmission based on the manual transmission, the second-speed position is selected for motion start-up on the slippery road. However, the manual shift must always be selected after the vehicle is started, which is troublesome.

Further, at start-up of the vehicle, the vehicle may move forward or backward. There is only one gear ratio for moving backward, so that a snow mode for backward motion generally is not provided, which results in difficulty in vehicle motion start-up on a slippery road.

Still further, when spinning of the drive wheel is detected on the slippery road, control of an accelerator degree by an electric throttle is required to control the driving force. However, response of the control is not good, so that appropriate control is difficult.

In addition, a throttle valve can be operated electronically to adjust the throttle opening degree for controlling a torque reduction. However, the driving force at motion start-up of the vehicle is determined by a start clutch and, in relation to the torque reduction control, the response of the control may not be good. Further, the throttle valve can also be operated by the accelerator pedal by the driver, but the engine does not respond to the throttle opening degree by the accelerator pedal, which results in the driver's uncomfortable feeling.

BRIEF SUMMARY OF THE INVENTION

In order to obviate or at least minimize the above problem, the present invention provides an automatic transmission for a vehicle. More particularly, an input shaft is connected to an engine through a main clutch, while an output shaft is connected to a drive wheel. A plurality of gear trains transmit the driving force of the input shaft to the output shaft at different ratios. A gear-shifting mechanism shifts the gear trains and is automatically controlled during gear shift. A drive wheel spin detector detects whether the drive wheel is spinning. A secondary or sub-clutch engages one of the gear trains, other than the first-speed and reverse gear trains. A controller connects the sub-clutch when a shift position is in a first-speed or a reverse position and when it is detected by the drive wheel spin detector that the drive wheel is spinning.

The present invention provides the sub-clutch to engage one of the gear trains, except for the first-speed and reverse gear trains, and to be connected when the shift position is in the first-speed or reverse position and the drive wheel spin detector detects that the drive wheel is spinning. The user (driver) does not need to change the switch for the slippery road, such as the snowy road. The vehicle motion can therefore be started smoothly forward or backward, in which running suitable for the slippery road can always be achieved. In addition, since this control is not initiated by the user, neglect of a switch return does not occur, so that the devices for vehicle start-up are prevented from overload and the driver does not need to worry about improper control. Further, this good controllability prevents the driver from any perceived uncomfortable feeling or sensation.

DETAILED DESCRIPTION OF THE INVENTION

Embodiments of the present invention will now be described in detail with reference to the drawings. FIGS. 1–7 illustrate an embodiment of the present invention.

Figure 3:
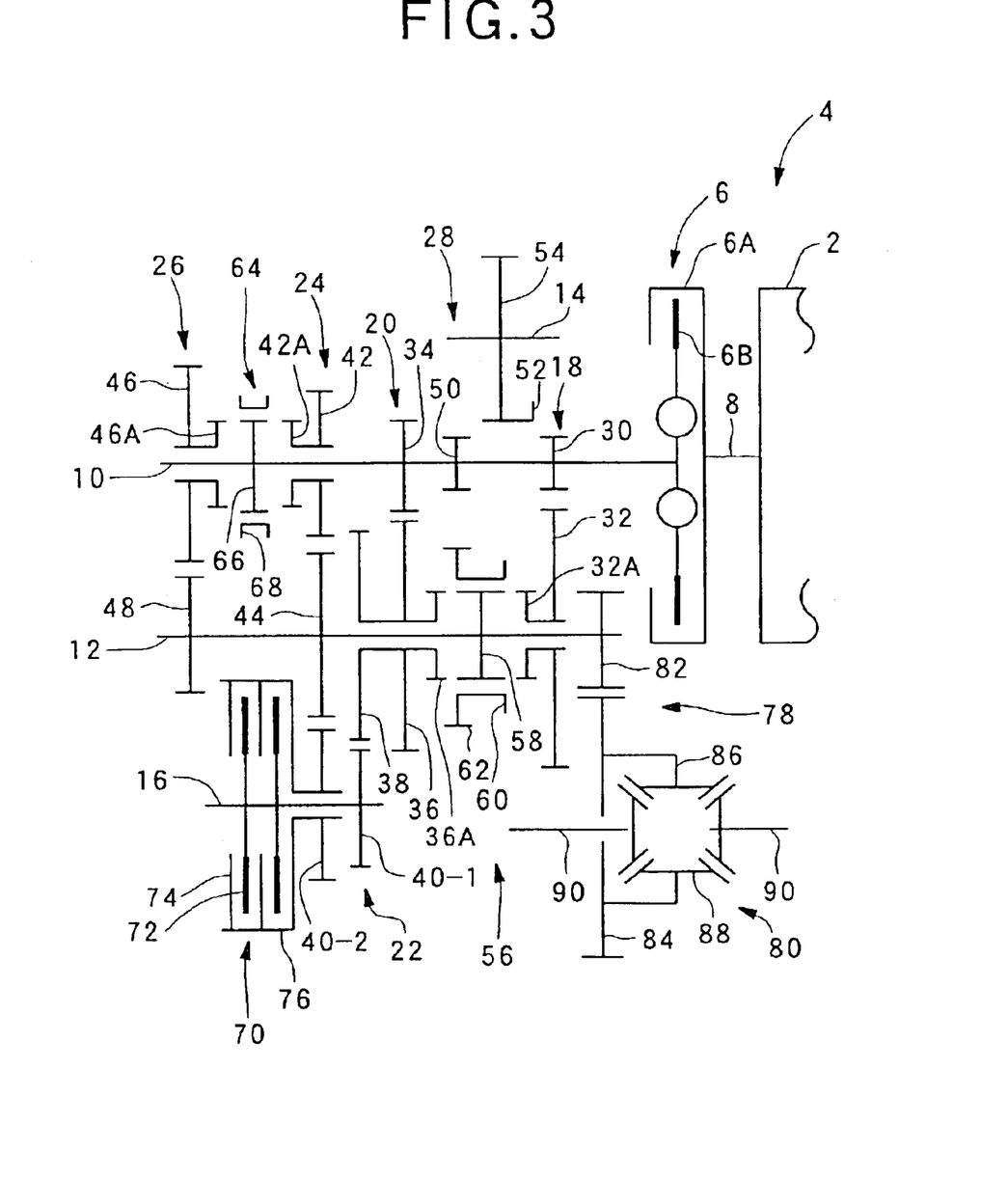
FIG. 3 is a diagram of the automatic transmission.

In FIG. 3, a vehicle includes an engine 2, and an automatic transmission 4 is connected to the engine 2 through a main clutch 6. The automatic transmission 4 is configured based on the normal gear-type manual transmission and has a plurality of gear trains (five gear trains for forward motion and one for backward or reverse motion in the illustrated embodiment), with the gear trains being automatically shifted. The main clutch 6 functions as a forward clutch and is controlled electronically and has a connection 6A toward the engine and a connection 6B toward the automatic transmission 4. The connections 6A, 6B engage and disengage the main clutch 6.

The automatic transmission 4 includes an input shaft (main shaft) 10 connected to the connection 6B for connection with the engine 2 through the main clutch 6. The automatic transmission 4 also includes an output shaft (counter shaft) 12, a reverse idler shaft 14, and an intermediate shaft (clutch shaft) 16, which shafts are parallel with the input shaft 10.

The shafts 10, 12 include a plurality of gear trains to transmit the driving force of the input shaft 10 to the output shaft 12 at different ratios. More particularly, the gear trains include, from the engine 2 side, a first-speed gear train 18, a second-speed gear train 20, a third-speed gear train 22, a fourth-speed gear train 24, a fifth speed gear train 26, and a reverse gear train 28 between the first and second gear trains 18, 20.

The first-speed gear train 18, often referred to as the low-speed gear train, comprises a first-speed drive gear 30 fixed to the input shaft 10, and a first-speed driven gear 32 which is rotatably supported on the output shaft 12 and meshes with the gear 30 and has a first-speed engaging portion 32A.

The second-speed gear train 20 comprises a second-speed drive gear 34 fixed to the input shaft 10, and a second-speed driven gear 36 which is rotatably supported on the output shaft 12 and meshes with the second speed drive gear 34 and has a second-speed engaging portion 36A.

The third-speed gear train 22 comprises a third-speed drive gear 38 integrated into the second-speed driven gear 36, a first middle gear 40-1 which is fixed to the intermediate shaft 16 and meshes with the third-speed drive gear 38, and a second middle gear 40-2 rotatably mounted on the intermediate shaft 16.

The fourth-speed gear train 24 comprises a fourth-speed drive gear 42 rotatably mounted on the input shaft 10 and having a fourth-speed engaging portion 42A, and a fourth-speed driven gear 44 which is fixed to the output shaft 12 and meshes with the fourth-speed drive gear 42 and the second middle gear 40-2.

The fifth-speed gear train 26 comprises a fifth-speed drive gear 46 rotatably mounted on the input shaft 10 and having a fifth-speed engaging portion 46A, and a fifth-speed driven gear 48 which is fixed to the output shaft 12 and meshes with the fifth-speed drive gear 46.

The reverse gear train 28 comprises a reverse drive gear 50 fixed to the input shaft 10, and a reverse idler gear 54 which is capable of meshing with the reverse drive gear 50 and is non-rotatably but axially slidably mounted on the reverse idler shaft 14 and has a reverse sleeve 52 integrated thereinto.

Between the gear trains 18, 20 on the output shaft 12, a 1st/2nd synchro mechanism 56 is arranged as a gear-shifting mechanism to shift between the first and second gear trains. The 1st/2nd synchro mechanism 56 comprises a 1st/2nd hub 58 fixed to the output shaft 12, and a 1st/2nd shift sleeve 60 which is non-rotatably but axially movable on the hub 58 in a direction of the output shaft 12 to selectively engage or disengage the first speed engaging portion 32A or the second speed engaging portion 36A. The synchro mechanism is controlled automatically during shift change for engaging either the first-speed or the second-speed gear train. The 1st/2nd sleeve 60 has a reverse driven gear 62 capable of meshing with the reverse idler gear 54.

Between the gear trains 24, 26, a 4th/5th synchro mechanism 64 is arranged on the input shaft 10 as a gear-shifting mechanism to shift the gear trains. The 4th/5th synchro mechanism 64 comprises a 4th/5th hub 66 fixed to the input shaft 10, and a 4th/5th shift sleeve 68 which is non-rotatably but axially movable on the hub 66 in a direction of the input shaft 10 to selectively engage or disengage the fourth speed engaging portion 42A or the fifth speed engaging portion 46A. The synchro mechanism 64 is controlled automatically during shift change for engaging either the fourth-speed or fifth-speed gear trains.

The intermediate shaft 16 includes a hydraulic sub-clutch 70 for engagement and disengagement. The sub-clutch 70 comprises clutch disks 72 which are non-rotatably fixed in alignment with the intermediate shaft 16, and a clutch cover 76 which is rotatably mounted on the intermediate shaft 16 and has a pressure plate 74 therein to connect and disconnect the clutch disks 72. The sub-clutch 70 effects engagement of one of the gear trains other than the first and reverse gear trains 18, 28. More particularly, the sub-clutch 70 functions as a third-speed engaging clutch and engages/disengages the third-speed gear train 22 so as to avoid disconnection of the accelerating power during shifting. The clutch cover 76 has the second middle gear 40-2 fixed thereto.

As discussed in greater detail hereinafter, the clutch 70 is engagable so that the third speed gear train 24 can be connected between the input and output shafts 10, 12 when the first speed gear train 18 or the reverse gear train 28 are engaged and wheel spin or slip is detected. In this condition, slip can occur in the clutch 70 to effect torque reduction between the input and the driven wheel. For example, the clutch 70 is only partially engaged so that slip occurs in the clutch 70 to prevent lock-up in the situation when there is simultaneous connection of the third speed gear train 22 as well as either the first-speed gear train 18 or the reverse gear train 28. The pressure used for actuating the clutch can be varied so as to vary clutch engagement and hence control the slippage and the torque reduction through the clutch.

A differential 80 is disposed through a final drive (reduction mechanism) 78 toward an end of the output shaft 12 toward the engine 2 with respect to the first-speed driven gear 32. The final drive 78 comprises a reduction gear 82 fixed to the output shaft 12, and a ring gear 84 in mesh with the reduction gear 82. The differential comprises a casing 86 having the ring gear 84 fixed thereto, and a pinion gear section 88 in connection with the casing 86. The pinion gear section 88 has right and left drive shafts 90, 90 to which right and left drive wheels (not shown) are mounted. Accordingly, the output shaft 12 is connected to the drive wheels through the final drive 78, differential 80, and the drive shaft 90. Differential 80 is of generally conventional construction.

Figure 2:
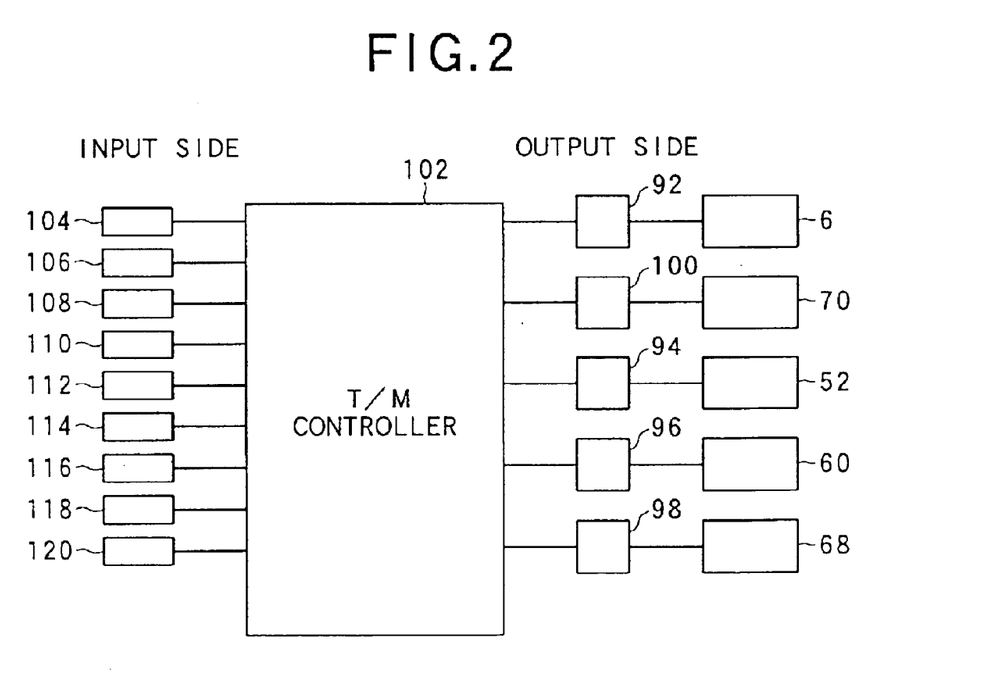
FIG. 2 is a block-diagram of a control circuit of the automatic transmission.

As shown in FIG. 2, the main clutch 6 is operated for connection and disconnection by a main clutch actuator 92. The reverse shift sleeve 52 is operated for connection and disconnection by a reverse shift actuator 94. The 1st/2nd shift sleeve 60 is operated for connection and disconnection by a 1st/2nd shift actuator 96. The 4th/5th shift sleeve 68 is operated for connection and disconnection by a 4th/5th shift actuator 98. The sub-clutch 70 is operated for connection and disconnection by a sub-clutch actuator 100.

A controller (T/M controller) 102 is connected with the main clutch actuator 92, the reverse shift actuator 94, the 1st/2nd shift actuator 96, the 4th/5th shift actuator 98, and the sub-clutch actuator 100.

The controller 102 is connected on an input side to: a throttle sensor 104 to detect an opening degree of a throttle valve (not shown); an engine speed sensor 106 to detect engine speed; an accelerator pedal sensor 108; an input shaft rotating speed sensor 110 to detect the rotating speed of the input shaft 10 as an input-side rotating speed; an output shaft rotating speed sensor 112 to detect the rotating speed of the output shaft 12 as an output-side rotating speed as a detector whether the drive wheel is spinning; a shift lever position sensor 114 to detect a position of a driver-controlled shift lever (not shown); a vehicle speed sensor 116 to detect vehicle speed; a main clutch sensor 118 to detect whether the main clutch 6 is engaged or disengaged; and a brake sensor 120 to detect whether the vehicle is braked. The controller 102 is connected on an output side to: the main clutch actuator 92; the reverse shift actuator 94; the 1st/2nd shift actuator 96; the 4th/5th shift actuator 98; and the sub-clutch actuator 100. Conventional sensors can be employed as the sensors, such as the input and output shafts speed sensors.

The controller 102 controls the sub-clutch 70 to be engaged when the shift position is in the first-speed or reverse position and when the output shaft speed sensor, acting as a drive wheel spin sensor, detects that the drive wheel is spinning.

In the automatic transmission 4, the vehicle is started or initially moved forward or backward in a first or reverse shift position, and the main clutch 6 for the start clutch is operated according to the value of the throttle opening, engine speed, input side rotating speed, output side rotating speed and the like. At this time, when the drive wheel spins on the slippery road, the output side rotating speed increases to show an abnormal value so that wheel spin can be detected. When the wheel spin is detected, the controller 102 allows the sub-clutch 70 to produce torque while utilizing the third-speed gear train 22 to create a double-mesh state in the automatic transmission 4 so as to restrain the driving force, i.e., control torque reduction, thereby securing the startability on the slippery road.

Next, the operation of this embodiment is described as follows.

Figure 1:
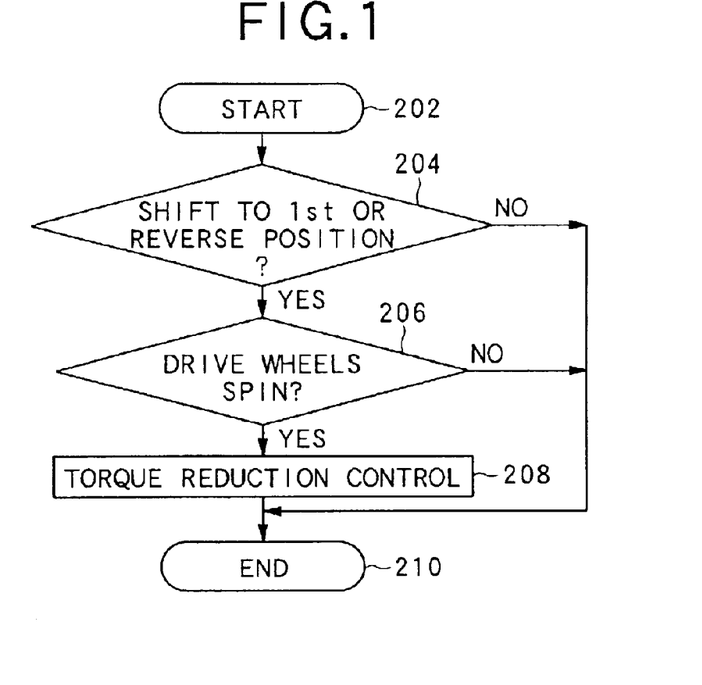
FIG. 1 is a flow chart of control of an automatic transmission.

Referring to FIG. 1, a program for controller 102 (not shown) starts at step 202. A determination is made at step 204 as to whether the shift lever is shifted into the first-speed or reverse position. If the determination at step 204 is "YES", then a determination is made at step 206 as to whether the drive wheel is spinning. If the determination at step 206 is "YES", then the control for torque reduction is executed at step 208 and the program ends at step 210. On the other hand, if the determinations at step 204 and 206 are "NO", then the program ends immediately at step 210.

Operation of the gear trains in the automatic transmission 4 will now be described as to the start of the vehicle in the first-speed or the reverse position.

First, the vehicle start in the first-speed position is described with reference to FIGS. 4 and 5.

Figure 4:
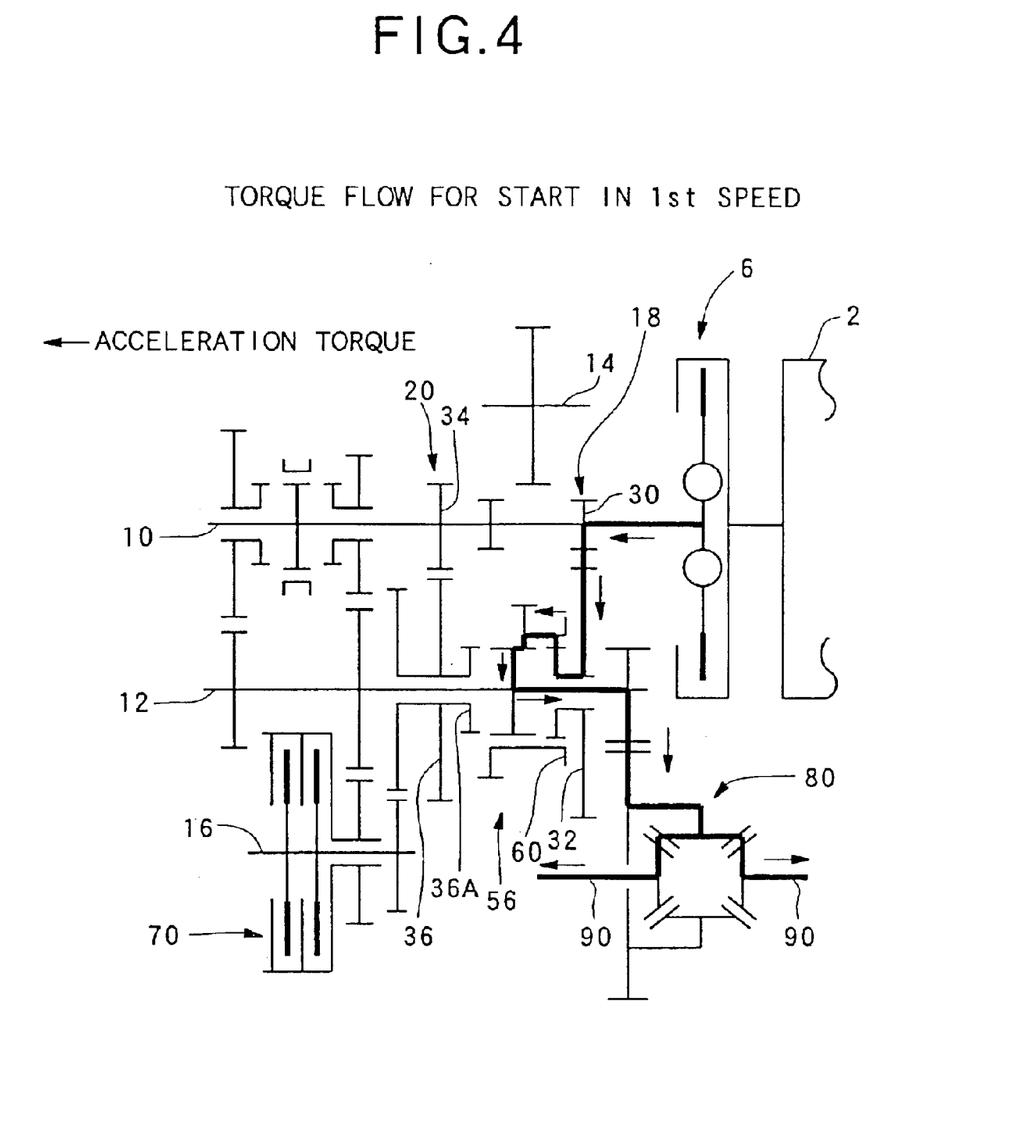
FIG. 4 is a diagram of the automatic transmission showing torque transmitted at motion start-up in a first-speed position.

As shown in FIG. 4, for motion start-up in the first-speed portion, as the 1st/2nd sleeve 60 of the 1st/2nd synchro mechanism 56 is disengaged from the second-speed engaging portion 36A of the second-speed driven gear 36, acceleration torque (see solid line arrows in FIG. 4) input from the main clutch 6 is transmitted to the drive wheels through the first-speed drive and driven gears 30, 32, the 1st/2nd synchro mechanism 56, output shaft 12, the differential 80, and the drive shaft 90. The sub-clutch 70 remains disengaged.

Figure 5:
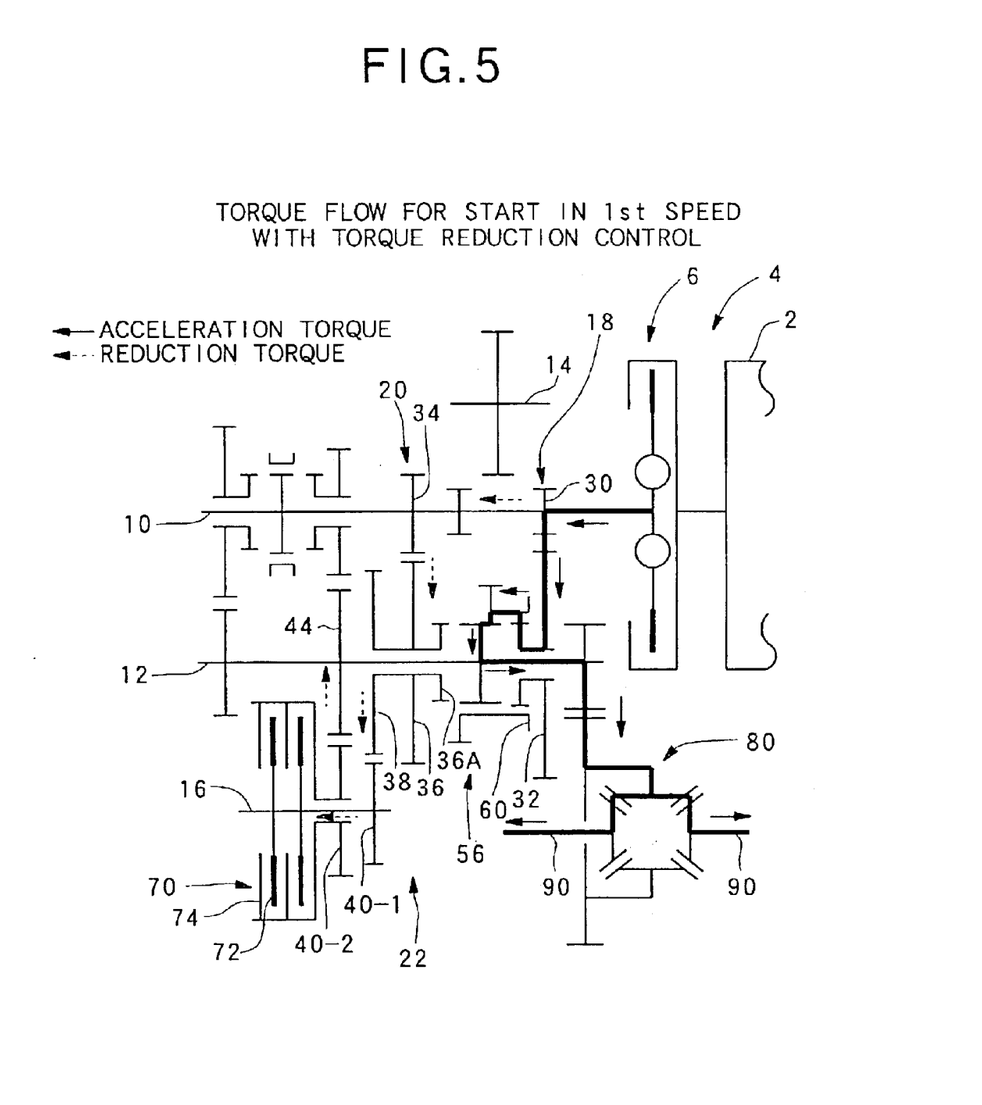
FIG. 5 is a diagram of the automatic transmission showing a torque reduction control at motion start-up in the first-speed position.

At this time, if the drive wheel is slipping spinning to abnormally increase the output shaft rotating speed, the sub-clutch 70 is provided with hydraulic pressure to engage the clutch disk 72 and the pressure plate 74, as shown in FIG. 5. The connection of the sub-clutch 70 permits some reduction of torque (shown as dashed line arrows in FIG. 5) as input from the main clutch 6 to transmit to the output shaft 12 via the second-speed gear train 20 through the third-speed drive gear 38, the first middle gear 40-1, the intermediate shaft 16, the second middle gear 40-2, and the fourth-speed driven gear 44. In the automatic transmission 4, the first-speed and third-speed gear trains 18, 22 are meshed with each other, i.e., the transmission is in a double-mesh state, to restrain the driving force to the drive wheels (control of the torque reduction).

Figure 6:
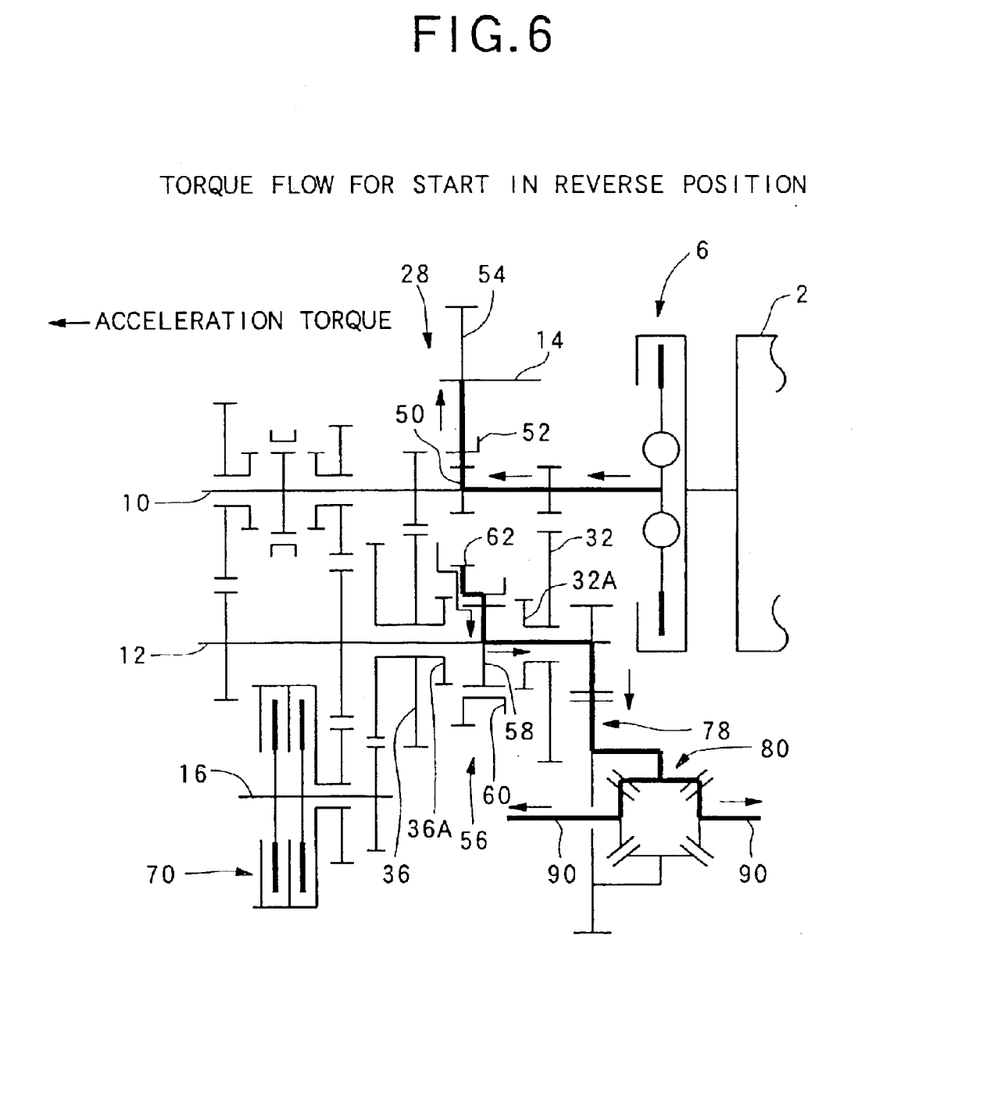
FIG. 6 is a diagram of the automatic transmission showing a torque transmitted at motion start-up in a reverse position.

Now referring to FIG. 6, for vehicle motion start-up in the reverse position, as the reverse drive gear 50 meshes with the reverse idler gear 54 and the 1st/2nd sleeve 60 of the 1st/2nd synchro mechanism 56 is positioned upwardly of the 1st/2nd hub 58 so as to be disengaged from the first and second speed engaging portions 32A, 36A of the first and second speed driven gears 32, 36, acceleration torque (solid line arrows in FIG. 6) input from the main clutch 6 is transmitted to the drive wheels through the reverse drive gear 50, reverse idler gear 54, the gear 62 of the 1st/2nd synchro mechanism 56, the output shaft 12, the final gear 78, the differential 80, and the drive shaft 90. The sub-clutch 70 remains disengaged.

Figure 7:
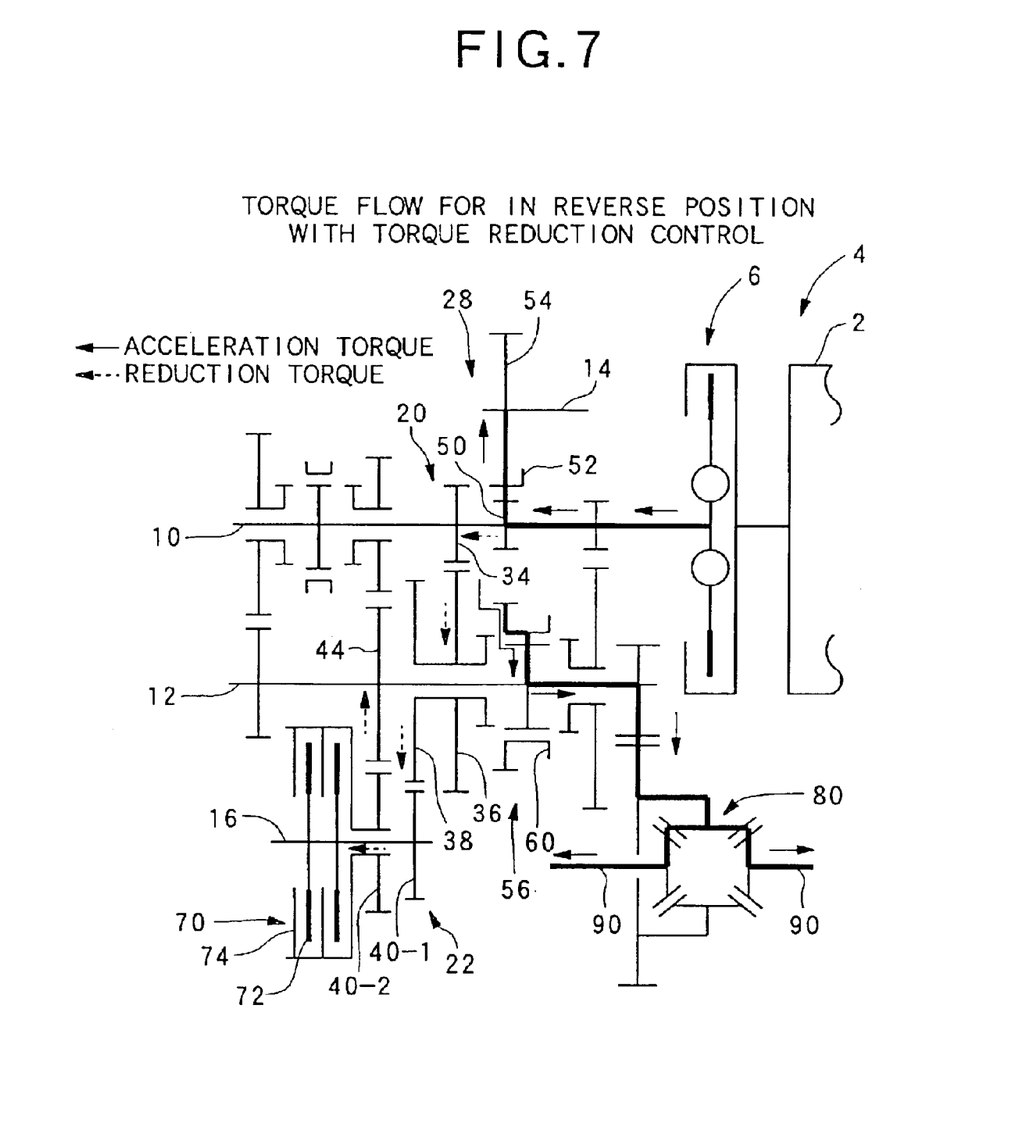
FIG. 7 is a diagram of the automatic transmission showing a torque reduction control at motion start-up in the reverse position.

At this time, if the drive wheel is spinning to abnormally increase the output shaft rotating speed, the sub-clutch 70 is provided with hydraulic pressure to engage the clutch disk 72 and the pressure plate 74, as shown in FIG. 7. The connection of the sub-clutch 70 permits some of the reduction torque (shown as dashed line arrows in FIG. 7) input from the main clutch 6 to transmit to the output shaft 12 via the second-speed gear train 20 through the third-speed drive gear 38, the first middle gear 40-1, the intermediate shaft 16, the second middle gear 40-2, and the fourth-speed driven gear 44. In the automatic transmission 4, the reverse and third-speed gear trains 28, 22 are meshed to each other, i.e., the transmission is in a double-mesh state, to restrain the driving force to the drive wheels (control of the torque reduction).

As a result, if the vehicle motion starts forward or backward in the first-speed or reverse position and it is detected that the drive wheel spins on the slippery road to abnormally increase the output shaft rotating speed, the sub-clutch 70 is engaged and is provided with torque to restrain the driving force to the drive wheels. Accordingly, the user (driver) does not need to change the transmission switch or selector for the mode suitable for the slippery road. The vehicle motion can therefore be started smoothly forward or backward, in which the running suitable for the slippery road can always be achieved. In addition, since this control is not controlled by the user, neglect of a switch or selector return does not occur, so that the devices for the vehicle motion start-up are prevented from overloading, and the driver does not need to worry about improper control. Further, this controllability prevents the driver from any perceived uncomfortable feeling or sensation.

In addition, as seen in FIG. 2, the conventional output shaft rotating speed sensor 112 is employed as a drive wheel spin sensor to detect the abnormal increase in the output shaft rotating speed resulting from wheel spin on the slippery road. An additional dedicated sensor for the control for the slippery road can be eliminated so as to reduce the number of parts and cost.

Still further, the sub-clutch 70 functions as the third-speed engaging clutch to engage the third-speed gear train 22 of the transmission, thereby preventing the disconnection of the accelerating force during shifting, and providing generally suitable performance of torque reduction required for prevention of drive wheel spin when the first-speed or reverse position is selected.

In this embodiment, the sub-clutch 70 is disposed at the position where it is capable of engagement with the gear trains. However, the sub-clutch 70 can be positioned at any position where the double mesh state in the automatic transmission can be achieved.

Moreover, engagement of the sub-clutch 70, and hence the permitted amount of clutch slippage, is adjusted according to the state of the wheel spin so as to effectively restrain the driving force to the drive wheels. The main clutch 6 is also simultaneously controlled when the wheel spin occurs so as to control the torque reduction.

As is clear from the detailed description of the invention, the present invention provides an automatic transmission for a vehicle, wherein a drive wheel spin detector detects whether the drive wheel is spinning, and a sub-clutch 70 engages one of the gear trains, other than the first-speed and reverse gear trains 18, 28, and a controller 102 connects the sub-clutch 70 when a shift position is in a first-speed or a reverse position and when it is detected by the drive wheel spin detector that the drive wheel is spinning. Therefore, the user (driver) does not need to change the shift lever or switch (i.e. selector) for the slippery road, such as a snowy road. The vehicle motion can therefore be started smoothly forward or backward, in which vehicle running suitable for the slippery road can be achieved. In addition, since this control is not controlled by the user, neglect of a switch return does not occur, so that devices for vehicle start are prevented from overload and the driver does not need to worry about improper control. Further, this good controllability prevents the driver from any perceived uncomfortable feeling or sensation.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An automatic transmission for a vehicle having an input shaft, a main clutch connecting the input shaft to an engine for driving the input shaft, an output shaft in connection with a vehicle drive wheel, a plurality of gear trains to transmit driving force from said input shaft to said output shaft at different ratios, and a gear-shift mechanism to shift the gear trains and to be automatically controlled during gear shift, comprising: a drive wheel spin detector to detect whether said drive wheel is spinning, a sub-clutch positioned downstream of said main clutch to engage one of said gear trains other than first-speed and reverse gear trains to effect transmission of driving force through said one gear train from said input shaft to said output shaft, and a controller to engage said sub-clutch when (1) said first-speed gear train or said reverse gear train is in driving engagement between said input and output shafts and (2) said drive wheel spin detector detects that said drive wheel is spinning.

2. An automatic transmission for a vehicle as defined in claim 1, wherein said drive wheel spin detector includes an output shaft rotating speed sensor to detect rotating speed of said output shaft as an output-side of transmission rotating speed.

3. An automatic transmission for a vehicle having an input shaft in connection with an engine through a main clutch, an output shaft in connection with a drive wheel, a plurality of gear trains to transmit driving force of said input shaft to said output shaft at different ratios, said plurality of gear trains including a first-, second-, and third-speed forward gear train each defining a different ratio between said input and output shafts and a reverse gear train, and a gear-shift mechanism to shift the gear trains and to be automatically controlled during gear shift, comprising: a drive wheel spin detector to detect whether said drive wheel is spinning, a sub-clutch positioned downstream of said input shaft to engage the third-speed gear train to cause transmission of driving force from said input shaft through said third gear train to said output shaft, and a controller to engage said sub-clutch when the first-speed gear train or the reverse gear train is engaged and said drive wheel spin detector detects that said drive wheel is spinning.

4. An automatic transmission for a vehicle as defined in claim 3, wherein said sub-clutch is at least partially engaged when there is simultaneous connection of the third gear train and either of the first-speed gear train or the reverse gear train so that slip occurs in the sub-clutch to prevent lock-up while reducing the torque transmitted to the drive wheel.

5. An automatic transmission for a vehicle as defined in claim 1, wherein said sub-clutch is at least partially engaged when there is simultaneous connection of said one gear train and either of the first-speed gear train or the reverse gear train so that slip occurs in the sub-clutch to prevent lock-up while reducing the torque transmitted to the drive wheel.

6. A vehicle comprising:

an engine, at least one drive wheel, a multi-speed automatic transmission for effecting transmission of driving force to the drive wheel, a controller for effecting automatic shifting of the transmission, and a main clutch drivingly connecting the output of the engine to an input shaft of the transmission;

said transmission including said input shaft and an output shaft in driving connection with said drive wheel, and a plurality of gear trains to transmit driving force from said input shaft to said output shaft, said plurality of gear trains including at least first, second and third forward speed gear trains each drivingly connectable between said input and output shafts and each defining a different speed ratio between said input and output shafts, said first gear train being the low-speed gear train for the vehicle, and a reverse gear train drivingly connectable between said input and output shafts;

said transmission including a shifter mechanism controlled by said controller for controlling engagement of said first and second gear trains as well as said reverse gear train;

said transmission including a secondary clutch associated solely with said third forward speed gear train and controlled by said controller for effecting engagement thereof to effect transmission of driving force from said input shaft through said third gear train to said output shaft;

a drive wheel spin detector to determine whether said drive wheel is spinning; and said controller configured to at least partially engage said secondary clutch when the first forward speed gear train is drivingly engaged between said input and output shafts and said drive wheel spin detector detects that said drive wheel is spinning so as to effect simultaneous connection of said third gear train together with said first gear train so as to reduce the driving force transmitted to the drive wheel while permitting slippage to occur in the secondary clutch.

7. A vehicle according to claim 6, wherein said controller is configured to at least partially engage said secondary clutch when said reverse gear train is in driving engagement between said input and output shafts and said drive wheel spin detector detects that the drive wheel is spinning so that simultaneous connection of said third gear train and said reverse gear train reduce the torque transmitted to the drive wheel while permitting slippage to occur in the secondary clutch.

8. A vehicle according to claim 7, wherein said transmission includes a fourth forward speed gear train associated with a shift mechanism which is controlled by said controller for effecting driving engagement between said input and output shafts at a speed ratio which is different from the other gear trains, said secondary clutch being associated solely with said third forward speed gear train, and said controller effecting at least partial engagement of said secondary clutch to effect a simultaneous driving connection of said third forward speed gear train and only either said first forward speed gear train or said reverse gear train and only when drive wheel spin is detected.

* * * * *